United States Patent [19]

Gaines

[11] 4,225,260
[45] Sep. 30, 1980

[54] TIE ROD BALL JOINT CONSTRUCTION

[75] Inventor: Donald R. Gaines, Farmington, Mich.

[73] Assignee: Gulf & Western Manufacturing Company, Southfield, Mich.

[21] Appl. No.: 16,916

[22] Filed: Mar. 2, 1979

[51] Int. Cl.² .............................................. F16C 11/06
[52] U.S. Cl. .................................... 403/114; 403/132; 285/264
[58] Field of Search ............... 403/114, 132, 133, 135, 403/136, 138, 139, 140, 127, 116, 122; 285/264, DIG. 8

[56] References Cited

U.S. PATENT DOCUMENTS

| | | | |
|---|---|---|---|
| 1,620,094 | 3/1927 | Gillick | 285/264 X |
| 1,854,302 | 4/1932 | Hansen | 285/DIG. 8 |
| 3,058,765 | 10/1962 | Thomas | 403/133 |
| 3,186,736 | 6/1965 | Warshawsky | 285/DIG. 8 |
| 3,226,142 | 12/1965 | Herbenar | 403/135 |

FOREIGN PATENT DOCUMENTS

| | | | |
|---|---|---|---|
| 698802 | 11/1940 | Fed. Rep. of Germany | 285/264 |
| 770914 | 7/1934 | France | 403/138 |

*Primary Examiner*—Andrew V. Kundrat
*Attorney, Agent, or Firm*—Barnes, Kisselle, Raisch & Choate

[57] ABSTRACT

A joint assembly having a socket member, a stud member, and restrainer elements constructed and arranged to prevent the socket and stud members from pivoting relative to each other in one plane containing the longitudinal axis of the stud member while permitting the members to pivot in a plane at a right angle to such one plane and containing such axis and permitting the stud member to rotate on such axis with respect to the socket member.

2 Claims, 4 Drawing Figures

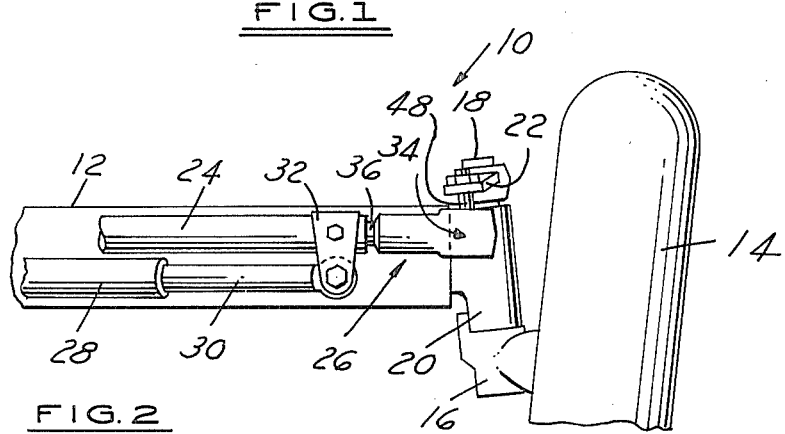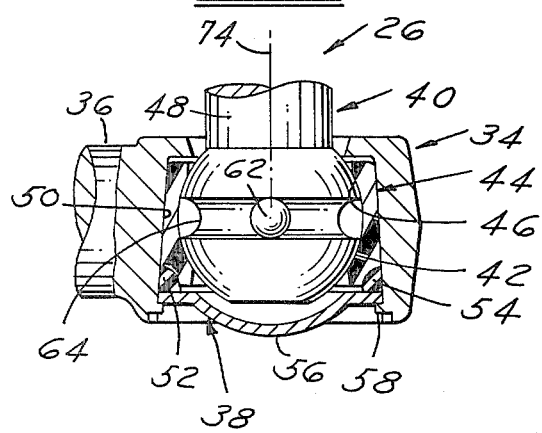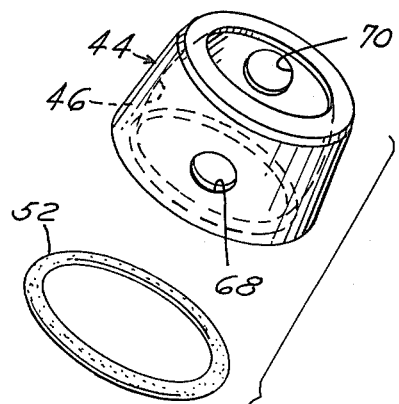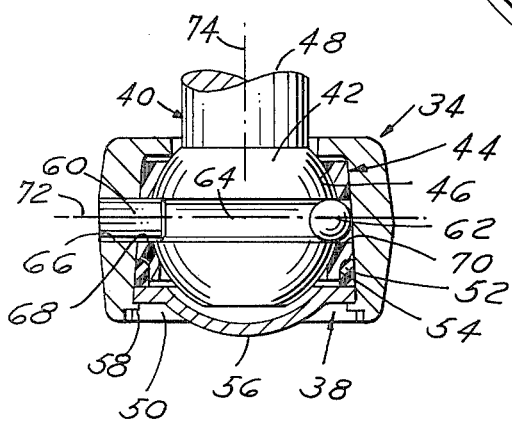

TIE ROD BALL JOINT CONSTRUCTION

This invention relates to joint constructions and more particularly to a joint construction for the steering linkage of motor vehicles and the like.

In the steering mechanism of some motor vehicles the tie rod is subjected to a torque which would rotate conventional ball joints connecting the tie rod to the steering knuckle thereby introducing undesirable lost motion and instability in the steering system. In such steering systems rotation of the tie rod can be resisted and prevented by ball joints such as those shown in Jones U.S. Pat. No. 3,527,316 issued Sept. 8, 1970, which are constructed and arranged so that the socket and ball stud members cannot be pivoted relative to each other in one plane containing the longitudinal axis of the ball stud while still permitting the members to pivot in a plane at a right angle to such one plane and containing such axis. In ball joints of the Jones patent relative pivoting or rotation in such one plane is prevented by either a slot in the socket housing which engages the stud at a point remote from the ball which is subject to considerable wear and hence has a relatively short useful life in-service or an assembly having a separate stem extending from the ball and received in a bearing slidably received in a slot in the housing which is a relatively expensive construction and requires an enlarged socket housing.

Objects, features and advantages of this invention are to provide a ball joint assembly with a socket which cannot be pivoted relative to the stud in one plane containing the axis of the stud which assembly has a compact housing, has a relatively long useful life in service, and is rugged, durable, maintenance free, of simplified design and economical manufacture and assembly.

These and other objects, features and advantages of this invention will be apparent from the following detailed description, appended claims and accompanying drawing in which:

FIG. 1 is a semischematic fragmentary view of a steering linkage utilizing a ball joint assembly embodying this invention;

FIGS. 2 and 3 are sectional views taken at a right angle to each other of the ball joint assembly of FIG. 1; and FIG. 4 is an exploded perspective view of some of the component parts of the ball joint assembly of FIG. 1.

Referring in more detail to the drawing FIG. 1 illustrates a steering mechanism 10 of a motor vehicle such as a tractor (not shown) having a solid front axle 12 and a wheel 14 mounted on the spindle of a steering knuckle 16 fixed to a king pin 18 journaled for rotation in a front axle extension 20. One end of a steering arm 22 is secured to king pin 18 and the other end of the arm is connected to a tie rod 24 by a ball joint assembly 26 embodying this invention. Wheel 14 is turned to steer the vehicle by force applied to the tie rod 24 by a hydraulic cylinder 28 through its piston rod 30 which is connected by a bracket 32 to the tie rod. The force applied by cylinder 28 creates a torque tending to rotate tie rod 24 on its longitudinal axis which rotation is resisted and prevented by ball joint assembly 26.

As shown in FIGS. 1 through 3, ball joint assembly 26 has a housing or socket member 34 with a mounting arm 36 threaded in tie rod 24 and a generally circular cavity 38 in which a ball stud member 40 is mounted. Member 40 has a generally spherical ball segment 42 received in an annular bearing seat 44 with a complimentary bearing surface 46, and an integral shank or stud portion 48 projecting from the cavity to the exterior of the socket 34. To provide compensation for in-service wear bearing seat 44 is urged into engagement with ball 42 by the cooperation of a tapered wall 50 of the cavity 38 and a ring 52 of an elastomeric material received in a groove 54 in the bearing seat and compressed by a closure cap 56 retained in the cavity by staked portions 58 of the socket.

In accordance with this invention pivoting of socket and stud members 34 and 40 relative to each other is prevented in one plane containing the longitudinal center line of the stud member while permitting both pivoting of the members in a plane at a right angle to such one plane and containing such center line and rotation of the stud member on such center line, by the cooperation of a pin 60 and a ball bearing 62 with a circumferentially continuous groove 64 in the equatorial region of the ball 42. Pin 60 is pressed into a hole 66 in the socket, passes through a clearance hole 68 in the bearing seat, and extends into the groove. Ball bearing 64 is received in a hole 70 in the bearing seat and extends into the groove. In use of joint assembly 26, the pin 60 and ball bearing 62 in cooperation with groove 64 prevent pivoting of the socket and stud members 34 and 40 in a plane defined by the longitudinal axis 72 of the pin and the longitudinal axis 74 of the stud member while permitting the stud member to rotate on its longitudinal axis.

In ball joint assemblies embodying this invention, preferably the socket is a forging of steel, the ball stud member, restrainer pin and restrainer bearing are of steel, the bearing seats and caps are of metal or plastic, and the wear take-up ring is of an elastomeric material but may be a sinuous ring of spring steel. When the joint assembly is in use, the socket and stud members cannot be pivoted relative to each other in one plane containing the axis of the stud member while they can be pivoted relative to each other in a plane at a right angle to such one plane and containing such axis and the stud member can rotate on its longitudinal axis relative to the socket member, thereby providing a suitable joint assembly for steering linkages requiring ball joints which prevent rotation of the tie rods to which they are connected. The joint assembly is of relatively simple and compact design, rugged and durable construction, may be economically manufactured and assembled, and is compensated for in-service wear of the moving parts to provide a long in-service useful life.

I claim:

1. A joint comprising a socket member having a cavity therein opening to the exterior thereof, a stud member having a ball portion received in said cavity and a stud projecting generally axially therefrom to the exterior of said socket member, said ball having a generally spherical bearing surface and an essentially continuous groove in the equatorial area of said generally spherical bearing surface, a bearing seat ring received in said cavity and having a generally spherical surface complimentary to and bearing on at least a portion of said generally spherical surface of said ball, a pin carried by said socket member and projecting into said groove, a ball projecting into said groove and said bearing seat, and said pin, last mentioned ball, and groove being constructed and arranged to essentially prevent pivoting of said members relative to each other in one plane containing the longitudinal axis of said stud member while permitting pivoting of said members relative to each other in a plane at a right angle to said one plane and containing said longitudinal axis of said stud member and permitting said stud member to rotate on its longitudinal axis relative to said socket member.

2. The joint of claim 1 which also comprises means yieldably urging together said bearing seat and said ball so as to provide a joint with in-service wear take-up compensation.

* * * * *